United States Patent [19]

Lamp et al.

[11] Patent Number: 5,486,664
[45] Date of Patent: Jan. 23, 1996

[54] SEAL FOR CORD PASSAGEWAY OF POWER POD

[75] Inventors: William G. Lamp, Brookfield; Clarence J. Spitzer, Grafton, both of Wis.

[73] Assignee: Eaton Corporation, Cleveland, Ohio

[21] Appl. No.: 266,050

[22] Filed: Jun. 27, 1994

[51] Int. Cl.$^6$ .................................................... H01H 9/02
[52] U.S. Cl. .................. 200/297; 200/43.22; 200/302.1; 200/304; 439/135
[58] Field of Search ................................ 200/217, 43.22, 200/293, 297, 302.1, 304; 439/133, 134, 135, 136, 137, 138, 139, 140, 141

[56] References Cited

U.S. PATENT DOCUMENTS 4,647,735  3/1987  Sicher ................................ 200/43.22
4,716,496  12/1987  Fritsch ..................................... 361/391
4,760,220  7/1988  Fritsch et al. .............................. 200/50

OTHER PUBLICATIONS

Seal E–Z Brochure, Seal E–Z Corp, 8013 Bark Terrace, Richmond, Va. 23237 (Undated).

*Primary Examiner*—Andres Kashnikow
*Assistant Examiner*—David J. Walczak
*Attorney, Agent, or Firm*—Larry G. Vande Zande

[57] ABSTRACT

A power pod enclosure having an electrical cord exit passage communicating with an open side of the enclosure has a brush seal attached to the enclosure whereby bristles project to a cover closing the open side, the bristles filling the passage to impede entrance to the enclosure through the passage and closely conform to cords exiting the enclosure through the passage.

17 Claims, 2 Drawing Sheets

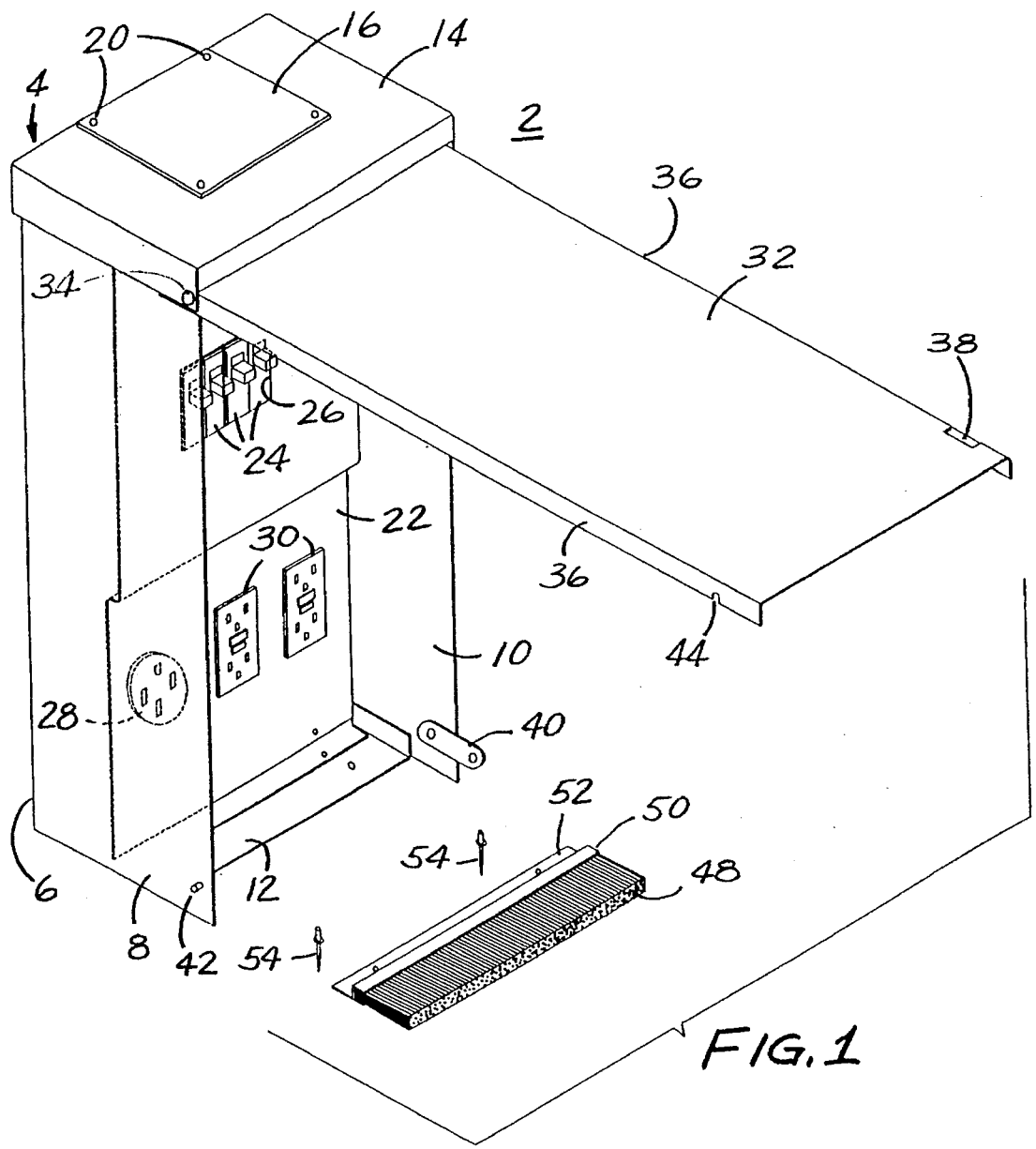
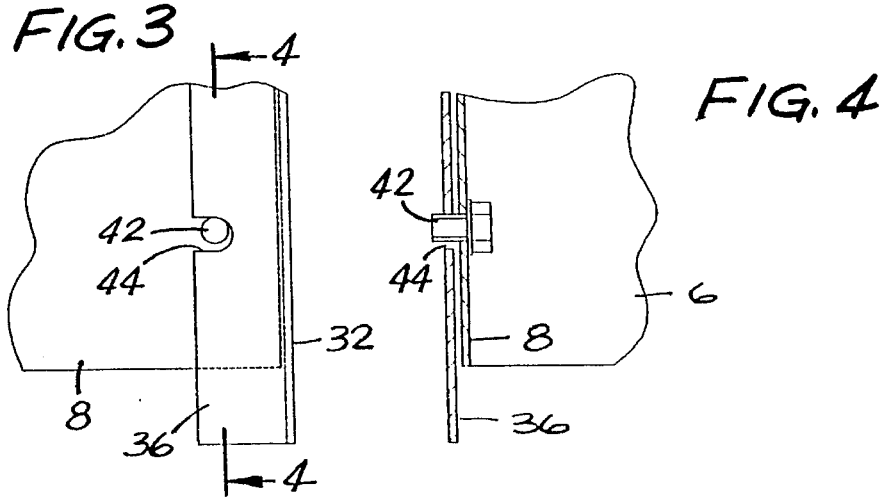

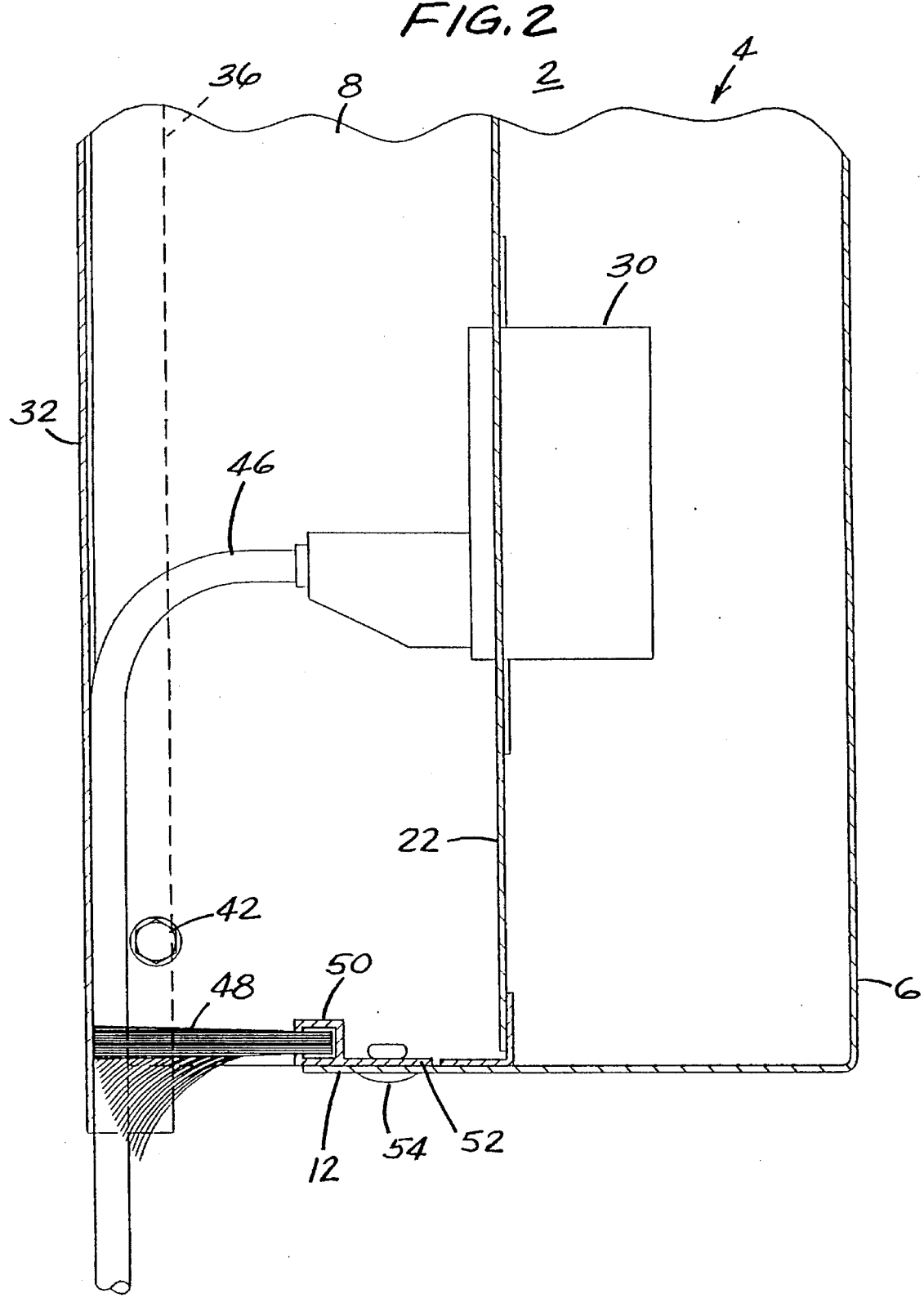

SEAL FOR CORD PASSAGEWAY OF POWER POD

BACKGROUND OF THE INVENTION

This invention relates to outdoor electric power outlets and more particularly to enclosures for outdoor electric power distribution outlets.

Outdoor electrical power outlets are well known, usually provided at the exterior of buildings for temporary electrical connection of small appliances and tools. Consumers visiting RV parks, boat landings and the like have more extensive electrical power requirements. These locations are provided with freestanding power pedestals or back mounted enclosures, called power pods, which provide one or more electrical power outlets, usually controlled and protected by a circuit breaker, behind a lockable cover hinged to the enclosure. The available outlet service may comprise one or more 110 volt outlets and a 220 volt outlet for larger appliances. A large opening is generally provided in the enclosure adjacent a bottom edge of the cover as a passageway for cords which are plugged into the outlets to exit the enclosure. The cover is generally kept closed and often padlocked to protect the circuit breakers and outlets and prevent unauthorized use of the electrical power provided at the outlets. However, the passageway for the cords provides an entrance to the enclosure for insects, birds and small animals whose presence in the enclosure can provide numerous hazards.

SUMMARY OF THE INVENTION

This invention provides an enclosed electric power distribution outlet comprising a plurality of circuit breaker controlled and protected electric power outlets mounted in a box and protected by a cover attached to the box for closing off an open side of the box, a bottom wall of the box being recessed away from the cover to provide a passageway between the bottom wall and the cover for electric power cords connected to the outlets, the passageway being sealed by a compliant seal attached to the bottom wall and extending across the passageway opening to the door. A projection on the box side wall cooperatively engages a slot on the cover to support the cover near the lower end thereof to maintain the cover properly adjusted relative to the open side of the box. The features and advantages of this invention will become more readily apparent in the following specification and claims when read in conjunction with the accompanying drawings.

BRIEF DESCRIPTION OF THE DRAWINGS

FIG. 1 is an exploded isometric view of an enclosed electric power distribution outlet having a seal for a cord passageway in accordance with this invention;

FIG. 2 is a partial cross sectional view of the lower portion of the enclosed electric power distribution outlet of FIG. 1 showing an electrical cord plugged into one of the power outlets and exiting the enclosure through the passageway opening and brush seal of this invention;

FIG. 3 is a fragmentary elevational view showing a support pin and cooperating notch for supporting the enclosure cover; and FIG. 4 is a cross sectional view taken along the line 4—4 in FIG. 3.

DETAILED DESCRIPTION OF THE PREFERRED EMBODIMENT

An enclosed electric power distribution outlet 2 is shown in FIG. 1. This type of outlet is primarily used for outdoor applications and is commonly referred to as a power pod. Outlet 2 comprises a box-like enclosure case 4 having a back wall 6, a pair of opposed side walls 8 and 10 extending forwardly from back wall 6, and a bottom wall 12 also extending forwardly from back wall 6 and joined to sidewalls 8 and 10. A top wall 14 has flanges that overlap the rear wall 6 and side walls 8 and 10 and has another flange along the forward edge thereof. A rectangular cover plate 16 and gasket are attached to the top wall 14 to cover an opening for a conduit hub (not shown). Screws 20 secure the cover 16 and gasket in place. The front side of enclosure case 4 is open.

A barrier 22 is mounted vertically within the enclosure case 4 intermediate rear wall 6 and the open front side of the case. The barrier 22 extends over the entire length of the case, the lower half of the barrier being offset rearwardly to provide additional front space in the lower half of the case. A plurality of overcurrent protective circuit breakers 24 are mounted in the upper half of the enclosure case 4, the forward escutcheons and operating handles of the circuit breakers projecting through an opening 26 in the barrier 22.

A plurality of power outlet receptacles are mounted in enclosure case 4 at the lower half of barrier 22. In the embodiment shown, one outlet 28 is a 220 volt plug-in receptacle for major appliances and the like. Outlet 28 is mounted to support brackets (not shown) installed to back wall 6 of case 4 and projects through an opening in barrier 22. A pair of 110 volt ground fault circuit interrupter plug-in receptacles 30 are mounted directly to barrier 22 adjacent outlet 28. Although not shown, receptacles 28 and 30 are hardwired to respective circuit breakers 24 behind barrier 22 and the circuit breakers are adapted to be wired to a source of electric power. The left-hand two circuit breakers are joined together as a two-pole 220 volt unit for the receptacle 28. The right-hand two circuit breakers are individually connected to the respective pair of 110 volt receptacles 30. The circuit breakers are manually operable to selectively switch electrical power to and from the respective receptacles from the source of electric power through the circuit breakers. It will be recognized by those skilled in the art that ground fault circuit interruption protection may be provided by GFCI circuit breakers instead of at the receptacles 30 if so desired.

A cover 32 is hingedly connected to the enclosure case 4 by a pair of screws 34 (only one shown) in a well known manner for outdoor rain-tight enclosures. The cover 32 has a pair of side flanges 36 which overlap the respective side walls 8 and 10 when the cover is closed over the open front side of the case 4, the flanges having upper extensions which are disposed between the respective side walls 8 and 10 and overlapping side flanges of upper wall 14. A slot 38 is provided in the cover 32 near the lower end thereof to receive a spring latch 40 which is affixed to the side wall 10. In a well known manner, the latch 40 maintains the cover 32 closed upon case 4 until it is intentionally deflected to release the cover. Latch 40 also provides a padlock hasp for receiving the shackle of a padlock if it is desired to lock the cover closed. A thread cutting screw 42 is driven through a hole in side wall 8 near the bottom end thereof to project laterally outward of the side wall. The projecting shank of screw 42 cooperates with a notch 44 in the left-hand flange 36 of cover 32 whereby an upper edge of the notch 44 rests upon the shank of screw 42 in the closed position of cover 32 to support the weight of the cover against gravitational displacement, thereby cooperating with hinge screws 34 and latch 40 to maintain the cover in proper alignment on the enclosure.

As may be seen in FIGS. 1 and 2, bottom wall 12 is recessed rearwardly of the forward edge of the enclosure case 4. The recessed forward edge of the bottom wall 12 and the enclosure cover 32 cooperate to complete a closed-perimeter passageway in the bottom of the case through which cords such as 46 (FIG. 2) may exit the enclosure when connected to the respective outlets. The cords such as 46 are generally outdoor purpose cords and may have various cross sectional shapes and thicknesses and may be relatively non-pliant such that specific slots in the bottom wall for such cords are generally unsatisfactory. However, a large opening such as provided by the recessed bottom wall 12 and cover 32 permits access to the inside of the enclosure through the passageway by insects, birds and small animals. Such inhabitants can cause damage to the electrical cords, outlets and exposed portions of the circuit breakers within the enclosure and can also pose a danger to the consumer when opening the cover of the enclosure.

This invention provides a seal for closing the cord passageway opening in the bottom wall of an enclosed electric power distribution outlet. The seal is a brush seal such as is available from Sealeze Corporation of Richmond, Va. wherein a straight strip bristle brush 48 comprising a multiplicity of bristles projecting from a supporting spine portion, the spine portion being retained in a channel shaped holder 50 having a mounting flange 52 projecting therefrom. The flange 52 is secured to lower wall 12 of the enclosure case by a pair of pop rivets 54 or other suitable fasteners. The bristles of brush seal 48 extend forward to the interior surface of cover 32 in the closed position of cover 32 on case 4 to fill the opening of the passageway and impede entrance to the enclosure through the passageway. However, the bristles are locally deflectable by the power cords 46 where the cords exit the enclosure, closely conforming to the power cord as it exits the enclosure to form a good seal therearound.

Thus the invention hereinbefore described provides a pliant seal for a power cord passageway of an enclosed outdoor electric power outlet. Although the invention has been shown and described in a preferred embodiment, it is to be understood that it is susceptible of various modifications without departing from the scope of the appended claims.

We claim:

1. An enclosed electric power outlet comprising:

an enclosure case having an open side;

a plug-in electrical receptacle in said case accessible through said open side;

an opening in a wall of said case, said opening communicating with said open side;

an enclosure cover attached to said case closing said open side and cooperating with said opening to complete a closed-perimeter exit passageway for an electrical cord adapted to be plugged into said receptacle; and a compliant seal attached to said enclosure, said seal filling said passageway in a normal condition of said seal and being locally deflectable by said cord exiting said enclosure through said passageway to closely conform to said cord without distorting portions of said seal remote from said cord.

2. The enclosed electric power outlet of claim 1 wherein said seal comprises a brush mounted to said wall of said enclosure, said brush having a multiplicity of bristles projecting across said opening to said cover in a normal condition of said bristles, thereby filling said passageway opening.

3. The enclosed electric power outlet of claim 2 wherein said power outlet further comprises switch means connected in circuit with said receptacle, said switch means being accessible for manual operation through said open side.

4. The enclosed electric power outlet of claim 3 wherein said switch means comprises overcurrent protective means.

5. The enclosed electric power outlet of claim 3 wherein said switch means comprises an overcurrent protective circuit breaker.

6. The enclosed electric power outlet of claim 5 further comprising ground fault responsive circuit interruption means in circuit with said receptacle.

7. An enclosed electric power distribution outlet comprising:

an enclosure comprising a case having an open side and a cover attached to said case, said cover having a closed position closing said open side of said case;

an electric plug-in receptacle mounted in said case, said receptacle being accessible from said open side of said case;

switch means mounted in said case, said switch means adapted to be connected to a source of electric power, being electrically connected to said receptacle within said case and having an operator accessible from said open side of said case; said switch means being operable to electrically connect said receptacle to said source of electric power;

said case having a wall, a portion of said wall being recessed away from said cover in said closed position of said cover, said recessed portion defining an opening between said cover and said wall, said opening being adapted to receive a cord therethrough when said cord is plugged into said plug-in receptacle; and a resilient seal attached to said enclosure, said seal filling said opening for impeding ingress to said enclosure, said seal being locally deflected by said cord and closely conforming to said cord when said cord is plugged into said plug-in receptacle.

8. The enclosed electric power distribution outlet of claim 7 wherein said resilient seal comprises a brush seal having a multiplicity of bristles supported along a spine, said spine comprising a support mounted to said wall whereby distal ends of said bristles are adjacent said cover.

9. The enclosed electric power distribution outlet of claim 7 wherein said recessed portion of said wall extends fully between opposed side walls of said case and said resilient seal comprises a brush seal having a multiplicity of bristles supported along a spine, said spine comprising a support mounted to said wall whereby distal ends of said bristles are adjacent said cover.

10. The enclosed electric power distribution outlet of claim 9 comprising means protruding from one of said side walls of said case and a notch in said cover engagable with said protruding means in said closed position of said cover for supporting said cover against gravitational displacement.

11. An enclosed electric power distribution outlet comprising:

an enclosure comprising a case and a cover pivotally connected to said case, said case comprising a rear wall, a top and a bottom wall and opposed side walls, said top, bottom and side walls extending forwardly from said back wall, said case being open at a front side thereof and said cover being pivotally movable to a closed position overlying said open front side of said case;

an electric plug-in receptacle mounted in said case, said receptacle being accessible for plug-in connection of an electrical cord from said open front side of said case;

electric switch means in said case hard wired within said case to said receptacle and adapted to be connected to a source of electric power, said switch means comprising an operator accessible from said open front side of said case, said switch means being operable to electrically connect said receptacle to a source of electric power;

said bottom wall of said case being recessed back from said front side, said recessed bottom wall defining an opening between said cover and said bottom wall, said opening being adapted to receive said electrical cord therethrough; and a resilient seal attached to said enclosure, said seal filling said opening and being locally deflected by said cord and closely conforming to said cord when said cord is plugged into said plug-in receptacle.

12. The enclosed electric power distribution outlet claimed in claim 11 wherein said bottom wall extends forwardly partially to said open front side to define said recessed bottom wall, and said seal comprises a brush seal having bristles supported at one end along a spine portion of said seal, said spine portion being attached to said bottom wall and distal ends of said bristles extending toward said cover.

13. The enclosed electric power distribution outlet claimed in claim 12 wherein said switch means comprise overcurrent responsive circuit breakers.

14. The enclosed electric power distribution outlet claimed in claim 13 further comprising ground fault responsive circuit interruption means in circuit with said receptacle.

15. The enclosed electric power distribution outlet claimed in claim 14 wherein said receptacle comprises ground fault circuit interrupter means.

16. The enclosed electric power distribution outlet claimed in claim 12 comprising means protruding from a side wall of said case and a notch in said cover mutually engagable in said closed position of said cover for supporting said cover against gravitational displacement.

17. An enclosed electric power distribution outlet for temporary outdoor electrical hook-ups comprising:

an enclosure having a door openable to provide access to electrical outlet receptacles and switches operable to connect electric power to said receptacles, said enclosure having an opening in a bottom wall thereof adjacent said door adapted for receiving electrical cords therethrough, said cords being adapted to be plugged into said receptacles; and a brush seal attached to said enclosure over said opening for closing off said opening, said seal being locally deflected by said cords and closely conforming to said cords when said cords are plugged into said plug-in receptacles.

\* \* \* \* \*